United States Patent [19]

Miyashita et al.

[11] Patent Number: 4,636,342

[45] Date of Patent: Jan. 13, 1987

[54] METHOD FOR CONTINUOUSLY MANUFACTURING NON-FIRED PELLETS

[75] Inventors: Tsuneo Miyashita, Yokohama; Hideyuki Yoshikoshi, Hino; Hiroaki Nishio, Yokohama; Osamu Takeuchi, Kawasaki, all of Japan

[73] Assignee: Nippon Kokan Kabushiki Kaisha, Tokyo, Japan

[21] Appl. No.: 578,858

[22] Filed: Feb. 10, 1984

[30] Foreign Application Priority Data

Feb. 28, 1983 [JP] Japan ................................ 58-30978

[51] Int. Cl.[4] ............................................ C04B 40/00

[52] U.S. Cl. ........................................ 264/82; 75/3

[58] Field of Search ...................... 264/63, 64, 66, 82, 264/117, 122; 75/3

[56] References Cited

U.S. PATENT DOCUMENTS

| | | | |
|---|---|---|---|
| 3,205,063 | 9/1965 | Franklin | 75/3 |
| 3,214,263 | 10/1965 | O'Connor | 75/3 |
| 3,437,474 | 4/1969 | Imperato | 75/3 |
| 3,492,385 | 1/1970 | Simunic | 264/82 |
| 3,525,784 | 8/1970 | Endell | 264/63 |
| 3,536,475 | 10/1970 | Trub | 264/117 |
| 3,567,428 | 3/1971 | Svensson | 75/3 |
| 3,653,874 | 4/1972 | Schulte | 75/3 |
| 3,730,692 | 5/1973 | Holowaty | 264/117 |
| 3,877,868 | 4/1975 | Wenzel et al. | 75/3 X |
| 3,953,563 | 4/1978 | Kihlstedt et al. | 264/82 |
| 4,116,679 | 9/1978 | Pietsch | 264/122 |
| 4,121,942 | 10/1978 | Kato | 264/82 |
| 4,131,668 | 12/1978 | Sasaki et al. | 264/117 |
| 4,199,348 | 4/1980 | Ground | 264/122 |
| 4,326,883 | 4/1982 | Schwarz | 264/122 |
| 4,427,610 | 1/1984 | Murray | 264/82 |

FOREIGN PATENT DOCUMENTS

| | | | |
|---|---|---|---|
| 0003665 | 8/1979 | European Pat. Off. . | |
| 1814624 | 7/1969 | Fed. Rep. of Germany | 264/117 |
| 0045714 | 8/1973 | Japan | 264/117 |
| 52-5610 | 1/1977 | Japan | 75/3 |
| 2097373 | 11/1982 | United Kingdom . | |
| 2114556 | 8/1983 | United Kingdom . | |

*Primary Examiner*—Donald Czaja
*Assistant Examiner*—Mary Lynn Fertig
*Attorney, Agent, or Firm*—Frishauf, Holtz, Goodman & Woodward

[57] ABSTRACT

A method and an apparatus for continuously manufacturing non-fired pellets, which comprise: continuously supplying green pellets containing a carbonating binder into a vertical type reactor to continuously pass the green pellets sequentially through a predrying zone, a carbonating zone and a drying zone in the vertical type reactor; blowing a predrying gas having a relative humidity of up to 70% and a temperature of from 40° to 250° C. into the predrying zone to predry the green pellets therein until the water content of the green pellets in the predyring zone falls within the range of from 1 to 7 wt. %; blowing a carbonating gas comprising carbon dioxide gas of from 5 to 95 vol. % and saturated steam of from 5 to 95 vol. % and having a temperature of from 30° to 98° C. into the carbonating zone to carbonate the carbonating binder contained in the green pellets therein; and blowing a drying gas at a temperature of from 100° to 300° C. into the drying zone to harden the green pellets therein, thereby continuously manufacturing non-fired pellets.

6 Claims, 7 Drawing Figures

METHOD FOR CONTINUOUSLY MANUFACTURING NON-FIRED PELLETS

FIELD OF THE INVENTION

The present invention relates to a method and an apparatus for continuously manufacturing non-fired pellets, which comprise mixing a carbonating binder and water with raw materials which comprise at least one of (i) iron ore fines, (ii) non-ferrous ore fines and (iii) dust mainly containing oxides of iron or non-ferrous metal, to form a mixture, forming said mixture into green pellets or green briquettes (hereinafter generally referred to as "green pellets"), and carbonating the carbonating binder contained in the thus formed green pellets, thereby hardening the green pellets without firing to manufacture non-fired pellets or non-fired briquettes (hereinafter referred to as "non-fired pellets").

BACKGROUND OF THE INVENTION

As a method for manufacturing non-fired pellets by hardening green pellets without firing through carbonation of a carbonating binder contained in the green pellets, a method for manufacturing non-fired pellets is disclosed in Japanese Patent Provisional Publication No. 50-45,714 dated Apr. 24, 1975, which comprises:

supplying green pellets containing a carbonating binder into a reactor; and blowing a carbonating gas containing carbon dioxide gas and having a prescribed temperature into the reactor to bring the carbonating gas into contact with the green pellets in the reactor to carbonate the carbonating binder contained in the green pellets, thereby hardening the green pellets to manufacture non-fired pellets (hereinafter referred to as the "prior art").

However, the above-mentioned prior art involves the following problems:

(1) Carbonation of the carbonating binder contained in the green pellets requires water and heating of the green pellets. In the prior art, the above-mentioned carbonating binder is carbonated by means of water contained in the green pellets and heating of the green pellets by the carbonating gas at the prescribed temperature. However, when the water content in the green pellets is decreased by heating of the green pellets, the carbonation of the carbonating binder is delayed and this leads to insufficient hardening of the green pellets, thus making it impossible to manufacture high-strength non-fired pellets in a short period of time.

(2) If too much water is contained in the green pellets to promote carbonation of the carbonating binder, on the other hand, there is posed another problem of collapsing or sticking of the green pellets in the reactor. Collapsing or sticking of the green pellets, if caused in the reactor, not only reduces the product yield but also causes adhesion of sticking green pellets onto the inner surfaces of the side walls of the reactor. As a result, when continuously supplying the green pellets into the reactor to continuously manufacture the non-fired pellets, smooth travelling of the green pellets through the reactor is impaired, finally making it impossible to manufacture the non-fired pellets.

For these reasons, there is a strong demand for the development of a method and an apparatus for continuously manufacturing high-strength non-fired pellets excellent in quality at a high yield in a short period of time, which, when continuously supplying green pellets containing a carbonating binder into a reactor, and blowing a carbonating gas containing carbon dioxide gas and having a prescribed temperature into the reactor to bring the carbonating gas into contact with the green pellets and to carbonate the carbonating binder contained in the green pellets, thereby hardening the green pellets to manufacture the non-fired pellets, promotes carbonation of the carbonating binder to harden the green pellets without causing collapsing or sticking of the green pellets in the reactor. However, such method and apparatus have not as yet been proposed.

SUMMARY OF THE INVENTION

An object of the present invention is therefore to provide a method and an apparatus for continuously manufacturing high-strength non-fired pellets excellent in quality at a high yield in a short period of time, which, when continuously supplying green pellets containing a carbonating binder into a reactor, and carbonating the carbonating binder contained in the green pellets, thereby hardening the green pellets to manufacture non-fired pellets, promotes carbonation of the carbonating binder to harden the green pellets without causing collapsing or sticking of the green pellets in the reactor.

In accordance with one of the features of the present invention, there is provided a method for continuously manufacturing non-fired pellets, which comprises:

mixing a carbonating binder and water with raw materials which comprise at least one of (i) iron ore fines, (ii) non-ferrous ore fines, and (iii) dust mainly containing oxides of iron or non-ferrous metal, to form a mixture; forming said mixture into green pellet having a water content of from over 7 to 20% by weight; continuously supplying said green pellets into a reactor; and blowing a carbonating gas at a prescribed temperature comprising a gas containing carbon dioxide gas into said reactor to bring said carbonating gas into contact with said green pellets in said reactor to carbonate said carbonating binder contained in said green pellets, thereby hardening said green pellets to continuously manufacture non-fired pellets;

characterized by:

using, as said reactor, a vertical type reactor comprising a predrying zone, a carbonating zone following said predrying zone and a drying zone following said carbonating zone;

continuously passing the green pellets through said predrying zone, said carbonating zone, and said drying zone sequentially in this order;

blowing a predrying gas having a relative humidity of up to 70% and a temperature within the range of from 40° to 250° C. into said predrying zone to predry the green pellets in said zone until the water content of the green pellets in said zone falls within the range of from 1 to 7 wt. %;

using, as said carbonating gas, a gas comprising carbon dioxide gas of from 5 to 95 vol. % and saturated steam of from 5 to 95 vol. % and having a temperature within the range of from 30° to 98° C., and blowing said carbonating gas into said carbonating zone to carbonate said carbonating binder contained in the green pellets in said zone; and blowing a drying gas at a temperature within the range of from 100° to 300° C. into said drying zone to dry the green pellets in said zone, thereby hardening the green pellets in said zone.

DETAILED DESCRIPTION OF PREFERRED EMBODIMENTS

Figure 1:
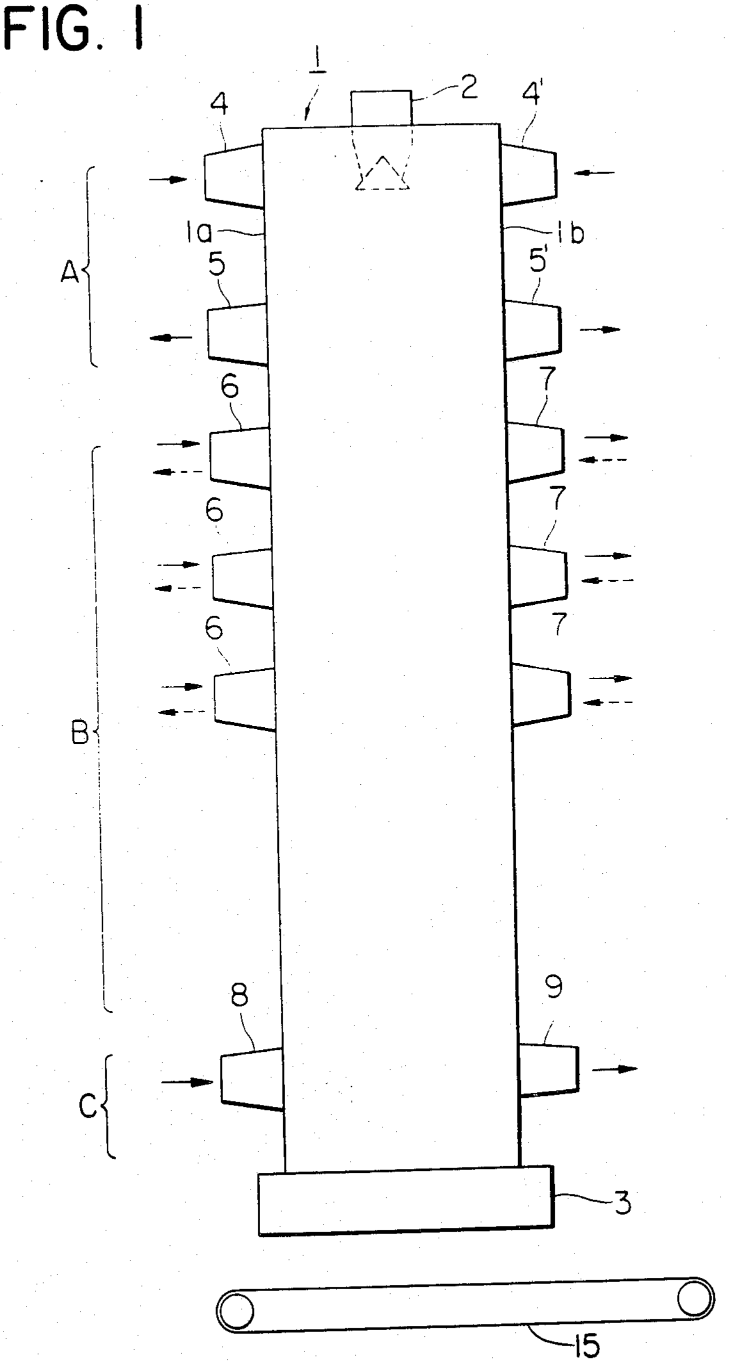
FIG. 1 is a schematic view illustrating the first embodiment of the apparatus of the present invention.

From the above-mentioned point of view, extensive studies were carried out with a view to developing a method and an apparatus for continuously manufacturing high-strength non-fired pellets excellent in quality at a high yield in a short period of time, which, when continuously supplying green pellets containing a carbonating binder into a reactor, and carbonating the carbonating binder contained in the green pellets, thereby hardening the green pellets to manufacture non-fired pellets, promotes carbonation of the carbonating binder to harden the green pellets without causing collapsing or sticking of the green pellets in the reactor.

As a result, the following finding was obtained: it is possible to promote carbonation of a carbonating binder contained in green pellets to harden the green pellets without causing collapsing or sticking of the green pellets in a reactor, and hence to continuously manufacture high-strength non-fired pellets excellent in quality at a high yield in a short period of time, by continuously supplying green pellets having a water content of from over 7 to 20% by weight containing a carbonating binder into a vertical type reactor comprising a predrying zone, a carbonating zone following said predrying zone, and a drying zone following said carbonating zone; continuously passing the green pellets through said predrying zone, said carbonating zone, and said drying zone sequentially in this order; blowing a predrying gas having a relative humidity of up to 70% and a temperature of from 40° to 250° C. into said predrying zone to predry the green pellets in said zone until the water content of the green pellets in said zone falls within the range of from 1 to 7 wt. %; blowing a carbonating gas comprising carbon dioxide gas of from 5 to 95 vol. % and saturated steam of from 5 to 95 vol. % and having a temperature of from 30° to 98° C. into said carbonating zone to carbonate said carbonating binder contained in the green pellets in said zone; and blowing a drying gas at a temperature of from 100° to 300° C. into said drying zone to dry the green pellets in said zone, thereby hardening the green pellets in said zone.

The purpose of predrying the green pellets in the predrying zone by means of the predrying gas having a relative humidity of up to 70% and a temperature of from 40° to 250° C. is to prevent, when carbonating the carbonating binder contained in the green pellets by the carbonating gas in the carbonating zone as described later, occurrence of collapsing or sticking of the green pellets caused by an excessive water content in the green pellets which takes place under the effect of saturated steam contained in the carbonating gas.

The predrying gas should have a relative humidity of up to 70% and a temperature within the range of from 40° to 250° C. If the predrying gas has a relative humidity of over 70%, it becomes difficult to predry the green pellets in the predrying zone to a prescribed value described later in a short period of time. When the predrying gas has a temperature of under 40° C., it becomes difficult to predry the green pellets in the predrying zone to a prescribed value in a short period of time, and on the other hand, if the temperature of the predrying gas is over 250° C., the green pellets in the predrying zone may be broken under the effect of thermal shock by the predrying gas.

The green pellets in the predrying zone should be predried until the water content in the green pellets in the predrying zone falls within the range of from 1 to 7 wt. %. When the water content in the green pellets after predrying becomes under 1 wt. %, it becomes difficult to carbonate the carbonating binder contained in the green pellets in the carbonating zone, and as a result, it is impossible to manufacture non-fired pellets excellent in quality. If the water content in the green pellets after predrying is over 7 wt. %, on the other hand, it is impossible, when carbonating the carbonating binder contained in the green pellets in the carbonating zone by the carbonating gas in the carbonating zone, to prevent occurrence of collapsing or sticking of the green pellets caused by an excessive water content in the green pellets which takes place under the effect of saturated steam contained in the carbonating gas.

In the carbonating zone, a gas comprising carbon dioxide gas and saturated steam is used as the carbonating gas for carbonating the carbonating binder contained in the green pellets for the following reasons: it is thus possible to supply water necessary for the carbonation of the carbonating binder contained in the green pellets to the green pellets in the carbonating zone by means of at least part of saturated steam contained in the carbonating gas; and it is possible to efficiently heat the green pellets through the fact that, when the temperature of the carbonating gas is decreased through heat exchange with the green pellets in the carbonating zone, at least part of the saturated steam contained in the carbonating gas condenses to generate condensation heat which compensates the heat of the carbonating gas lost through heat exchange with the green pellets.

The carbon dioxide gas content in the carbonating gas should be within the range of from 5 to 95 vol. %, and the saturated steam content should be within the range of from 5 to 95 vol. %. If the carbon dioxide gas content in the carbonating gas is under 5 vol. %, carbonation of the carbonating binder contained in the green pellets becomes insufficient, and as a result, it is impossible to manufacture non-fired pellets excellent in quality. On the other hand, if the carbon dioxide gas content in the carbonating gas is over 95 vol. %, the saturated steam content described later becomes relatively smaller, leading to insufficient supply of water from saturated steam to the green pellets and insufficient heating of the green pellets. As a result, it is impossible to promote carbonation of the carbonating binder contained in the green pellets. When the saturated steam content in the carbonating gas is under 5 vol. %, supply of water from saturated steam to the green pellets and heating of the green pellets become insufficient as described above. When the saturated steam content in the carbonating gas is over 95 vol. %, on the other hand, the carbon dioxide gas content becomes relatively smaller, and leads to insufficient carbonation of the carbonating binder contained in the green pellets as described above.

The temperature of the carbonating gas should be within the range of from 30° to 98° C. When the temperature of the carbonating gas is under 30° C., the green pellets are heated only insufficiently, and as a result, it is impossible to promote carbonation of the carbonating binder contained in the green pellets. The temperature of the carbonating gas of over 98° C., on the other hand, leads to a carbon dioxide gas content in the carbonating gas of under 5 vol. %, resulting in insufficient carbonation of the carbonating binder contained in the green pellets.

The purpose of drying the green pellets in the drying zone by means of the drying gas blown into said zone is to remove water contained in the green pellets, the carbonating binder of which has been carbonated in the carbonating zone, and thus to obtain non-fired pellets having a high compression strength. The temperature of the drying gas should be within the range of from 100° to 300° C. At a drying gas temperature of under 100° C., drying exerts only a limited effect of improving compression strength of the non-fired pellets. At a drying gas temperature of over 300° C., on the other hand, the non-fired pellets show a decreased compression strength.

Use of a gas containing carbon dioxide gas of at least 5 vol. % as the drying gas to be blown into the drying zone is very effective for improving compression strength of the non-fired pellets. More particularly, when drying the green pellets, the carbonating binder of which has been carbonated, by means of the drying gas containing carbon dioxide gas of at least 5 vol. %, not only the green pellets are fully dried, but also the carbonating binder remaining in the green pellets are carbonated by carbon dioxide gas contained in the drying gas and water remaining in the green pellets. As a result, it is possible to obtain non-fired pellets having an improved compression strength. The drying gas should contain carbon dioxide gas in an amount of at least 5 vol. %. With a carbon dioxide gas content of under 5 vol. %, it is impossible to obtain the above-mentioned effect of improving compression strength of non-fired pellets.

As the carbonating binder in the method of the present invention, at least one of slaked lime, slags produced in steelmaking such as converter slag and electric furnace slag, and slag produced when manufacturing a ferroalloy is employed. Particularly, slag produced when manufacturing medium-carbon ferromanganese is suitable as the carbonating binder because of the relatively rapid carbonation by the carbonating gas and the low cost.

Now, the method and the apparatus for continuously manufacturing non-fired pellets of the present invention are described with reference to the drawings.

FIG. 1 is a schematic view illustrating the first embodiment of the apparatus of the present invention. A vertical type reactor 1 having a green pellet inlet 2 at the upper end thereof and a non-fired pellet outlet 3 at the lower end thereof comprises a predrying zone A for predrying green pellets continuously supplied through the green pellet inlet 2 into the vertical type reactor 1 by means of a predrying gas having a relative humidity of up to 70% and a temperature within the range of from 40° to 250° C. until the water content in the green pellets falls within the range of from 1 to 7 wt. %, a carbonating zone B following the predrying zone A, for carbonating the carbonating binder contained in the thus predried green pellets by means of a carbonating gas comprising carbon dioxide gas of from 5 to 95 vol. % and saturated steam of from 5 to 95 vol. % and having a temperature within the range of from 30° to 98° C., and a drying zone C following the carbonating zone B, for drying the green pellets, the carbonating binder of which has thus been carbonated, by means of a drying gas at a temperature within the range of from 100° to 300° C. The predrying zone A, the carbonating zone B and the drying zone C are arranged from up to down in this order. The green pellets continuously supplied through the green pellet inlet 2 into the vertical type reactor 1 pass the predrying zone A, the carbonating zone B and the drying zone C sequentially in this order.

The predrying zone A has, on each of opposite side walls 1*a* and 1*b* thereof, at least one predrying gas blowing port 4 and 4' for blowing the predrying gas into the predrying zone A, and at least one predrying gas discharge port 5 and 5', located below the at least one predrying gas blowing port 4 and 4', for discharging to outside the predrying gas blown through the at least one predrying gas blowing port 4 and 4' into the predrying zone A.

The carbonating zone B has, on one side wall 1*a*, at least one carbonating gas blowing port 6 for blowing the carbonating gas into the carbonating zone B, and on the other side wall 1*b* thereof, at least one carbonating gas discharge port 7 for discharging to outside the carbonating gas blown through the at least one carbonating gas blowing port 6 into the carbonating zone B.

The drying zone C has, on one side wall 1*a*, at least one drying gas blowing port 8 for blowing the drying gas into the drying zone C, and on the other side wall 1*b* thereof, at least one drying gas discharge port 9 for discharging to outside the drying gas blown through the at least one drying gas blowing port 8 into the drying zone C. In FIG. 1,15 is a conveyor, provided below the lower end of the vertical type reactor 1, for transporting the non-fired pellets discharged from the non-fired pellet discharge port 3 of the vertical type reactor 1.

The green pellets, containing water within the range of from over 7 to 20 wt. %, continuously supplied into the vertical type reactor 1 through the green pellet inlet 2 at the upper end thereof, are predried in the predrying zone A until the water content thereof falls within the range of from 1 to 7 wt. % by means of the predrying gas, having a relative humidity of up to 70% and a temperature within the range of from 40° to 250° C., blown through the at least one predrying gas blowing port 4 and 4' into the predrying zone A.

The carbonating binder contained in the thus predried green pellets is carbonated in the carbonating zone B by means of the carbonating gas, comprising carbon dioxide gas of from 5 to 95 vol. % and saturated steam of from 5 to 95 vol. % and having a temperature within the range of from 30° to 98° C., blown through the at least one carbonating gas blowing port 6 into the carbonating zone B.

As shown by the solid-line arrows in FIG. 1, the carbonating gas is blown through the at least one carbonating gas blowing port 6 provided on the one side wall 1*a* of the carbonating zone B into the carbonating zone B, and discharged to outside through the at least one carbonating gas discharge port 7 provided on the other side wall 1*b*. As shown by the dotted-line arrows in FIG. 1, the flow of the carbonating gas may be switched over at certain time intervals so that the carbonating gas may be blown through the at least one carbonating gas discharge port 7 provided on the other side wall 1*b* into the carbonating zone B and discharged to outside through the at least one carbonating gas blowing port 6 provided on the other side wall 1*a*. By doing so, it is possible to more uniformly heat the green pellets in the carbonating zone B, and promote carbonation of the carbonating binder contained in the green pellets.

The green pellets, the carbonating binder of which has been carbonated in the carbonating zone B, are dried and hardened into non-fired pellets in the drying zone C by means of the drying gas, at a temperature within the range of from 100° to 300° C., blown through the at least one drying gas blowing port 8 into the drying zone C, and then continuously discharged through the non-fired pellet outlet 3.

As described above, the green pellets, containing water of from over 7 to 20 wt. %, continuously supplied into the vertical type reactor 1 through the green pellet inlet 2 at the upper end thereof are predried in the predrying zone A to water content of from 1 to 7 wt. %. Therefore, when carbonating the carbonating binder contained in the green pellets in the carbonating zone B by means of the carbonating gas, it never happens that the water content in the green pellets becomes excessive under the effect of saturated steam contained in the carbonating gas to cause collapsing or sticking of the green pellets. When carbonating in the carbonating zone B the carbonating binder contained in the green pellets thus predried in the predrying zone A, at least part of saturated steam contained in the carbonating gas supplies water and heat necessary for carbonating reaction. This promotes carbonation of the carbonating binder, permitting hardening of the green pellets. The green pellets, the carbonating binder of which has been carbonated, is further dried in the drying zone C by means of the drying gas. It is thus possible to continuously manufacture high-strength non-fired pellets excellent in quality at a high yield in a short period of time.

Figure 2:
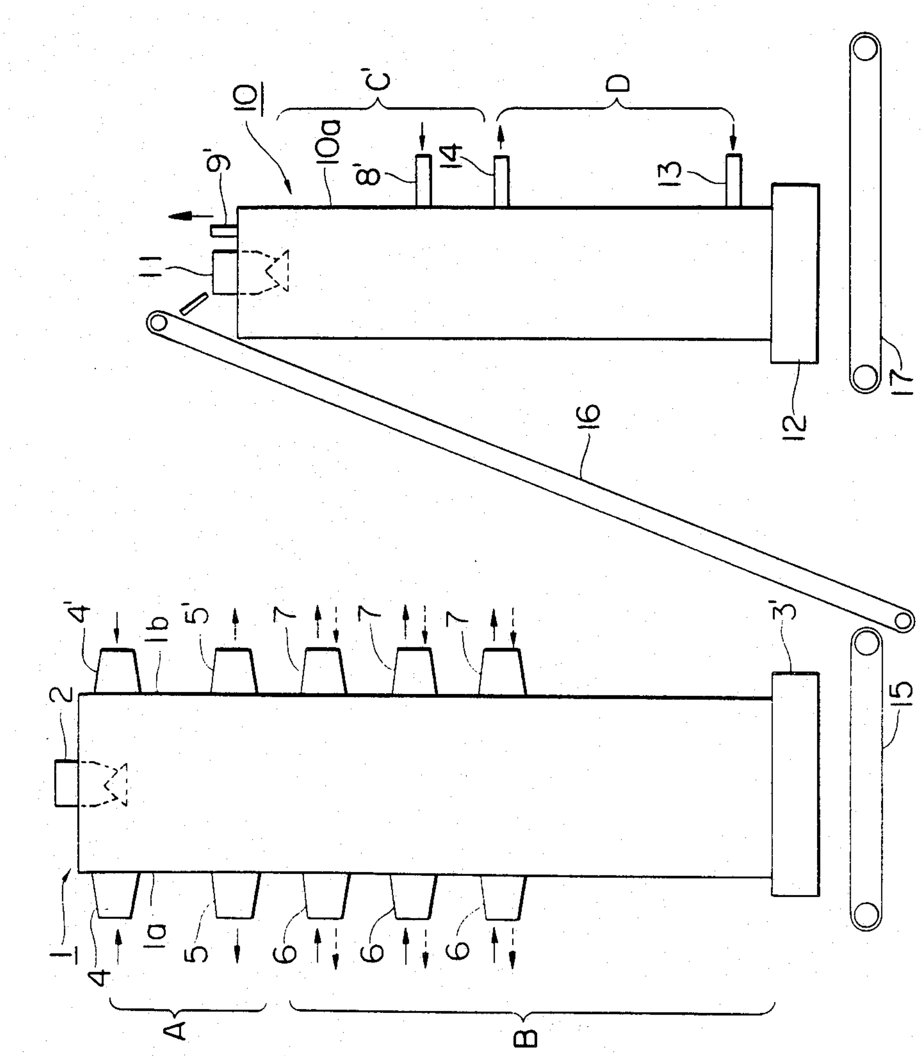
FIG. 2 is a schematic view illustrating the second embodiment of the apparatus of the present invention.

FIG. 2 is a schematic view illustrating the second embodiment of the apparatus of the present invention. In the apparatus shown in FIG. 2, the drying zone comprises a separate drying vessel 10. The separate drying vessel 10 comprises a drying zone C′ located in the upper portion thereof, and cooling zone D, following the drying zone C′, located therebelow, for cooling the non-fired pellets dried in the drying zone C′, by means of a cooling gas. The separate drying vessel 10 has, at the upper end thereof, an inlet 11 for receiving the green pellets, the carbonating binder of which has been carbonated, continuously supplied from the carbonating zone B, and at the lower end thereof, a non-fired pellet outlet 12.

The drying zone C′ has, at the lower portion of a side wall 10*a* thereof, at least one drying gas blowing port 8′, and at the upper portion of the side wall 10*a*, at least one drying gas discharge port 9′ for discharging the drying gas blown through the drying gas blowing port 8′ into the drying zone C′.

The cooling zone D has, at the lower portion of the side wall 10*a* thereof, at least one cooling gas blowing port 13 for blowing a cooling gas into the cooling zone D, and at the upper portion of the side wall 10*a*, at least one cooling gas discharge port 14 for discharging the cooling gas blown into the cooling zone D. In FIG. 2, 16 is a conveyor for transporting the green pellets, the carbonating binder of which has been carbonated, discharged through the green pellet discharge port 3′ of the vertical type reactor 1 to the inlet 11 of the separate drying vessel 10, and 17 is a conveyor for transporting the non-fired pellets discharged from the non-fired pellet outlet 12 of the separate drying vessel 10.

The green pellets, having a water content of from over 7 to 20 wt. %, continuously supplied into the vertical type reactor 1 through the green pellet inlet 2 at the upper end thereof, are, as in the first embodiment described above with reference to FIG. 1, predried in the predrying zone A, the carbonating binder of the thus predried green pellets being then carbonated in the carbonating zone B, and then discharged through the green pellet discharge port 3′. The green pellets, the carbonating binder of which has been carbonated, discharged from the carbonating zone B through the green pellet discharge port 3′, are continuously supplied on the conveyors 15 and 16 into the separate drying vessel 10 through the inlet 11 at the upper end thereof, and dried in the drying zone C′ into the non-fired pellets. The non-fired pellets are cooled in the cooling zone D following the drying zone C′, discharged through the non-fired pellet outlet 12, and then transported on the conveyor 17.

In the apparatus of the above-mentioned second embodiment, the separate drying vessel 10 may have a construction in which the cooling zone D is not provided, and the green pellets, the carbonating binder of which has been carbonated, are only dried. When the separate drying vessel 10 has such a construction, the non-fired pellets dried and hardened in the separate drying vessel 10 are discharged from the non-fired pellet outlet 12, and allowed to cool spontaneously in open air while being transported on the conveyor 17.

Figure 3:
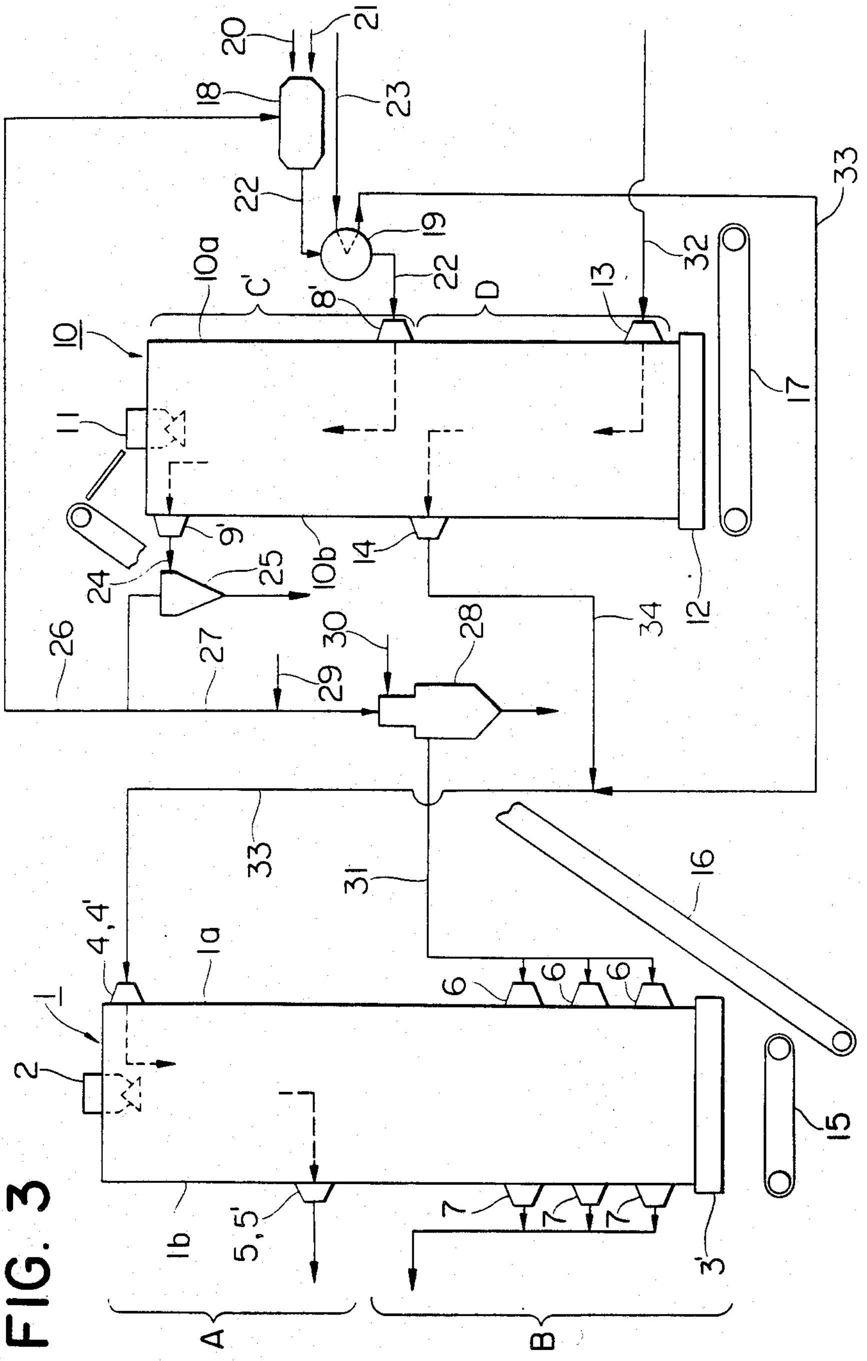
FIG. 3 is a schematic view illustrating the third embodiment of the apparatus of the present invention.

FIG. 3 is a schematic view illustrating the third embodiment of the apparatus of the present invention. In the apparatus shown in FIG. 3, the drying zone comprises a separate drying vessel 10 as in the second embodiment described above with reference to FIG. 2, and the separate drying vessel 10 comprises a drying zone C′ in the upper portion thereof and a cooling zone D, following the drying zone C′, located therebelow. The drying zone C′ has, at the lower portion of a side wall 10*a* thereof, at least one drying gas blowing port 8′, and at the upper portion of the other side wall 10*b*, at least one drying gas discharge port 9′. The cooling zone D has, at the lower portion of the side wall 10*a* thereof, at least one cooling gas blowing port 13, and at the upper portion of the other side wall 10*b*, at least one cooling gas discharge port 14.

The green pellets, the carbonating binder of which has been carbonated, continuously supplied into the separate drying vessel 10 through the inlet 11 at the upper end thereof, are dried and hardened in the drying zone C′ into the non-fired pellets by means of a drying gas blown into the drying zone C′ through a drying gas supply pipe 22 and the at least one drying gas blowing port 8′. The non-fired pellets are cooled in the cooling zone D by means of a cooling gas blown into the cooling zone D through a cooling gas supply pipe 32 and the at least one cooling gas blowing port 13.

In FIG. 3, 18 is a high-temperature gas generating furnace, serving as the drying gas generator for preparing the drying gas at a temperature within the range of from 100° to 300° C. to be blown into the drying zone C′, and 19 is a heat exchanger serving also as the drying gas generator. The high-temperature gas generating furance 18 burns a fuel comprising at least one of heavy oil, natural gas, propane gas, blast furnace gas, coke oven gas and steelmaking converter gas, which is supplied through a fuel supply pipe 20, by means of air supplied through an air supply pipe 21, to produce a high-temperature combustion exhaust gas. The temperature of the high-temperature combustion exhaust gas thus produced is adjusted for example to 310° C. by addition of part of the drying gas, which is discharged from the drying zone C′ through the at least one drying gas discharge port 9′ and introduced into the high-temperature gas generating furnace 18 through ducts 24 and 26. The heat exchanger 19 cools the high-temperature combustion exhaust gas from the high-temperature gas generating furnace 18, through heat exchange with air at ambient temperature supplied through a heat exchanging air supply pipe 23, to prepare a drying gas at a temperature of for example 210° C.

The drying gas thus prepared in the heat exchanger 19 is blown from the heat exchanger 19 through the drying gas supply pipe 22 and the at least one drying gas blowing port 8′ of the separate drying vessel 10 into the drying zone C′ of the separate drying vessel 10. Air heated through heat exchange with the high-temperature combustion exhaust gas in the heat exchanger 19 is blown, together with the cooling gas blown into the cooling zone D through the at least one cooling gas blowing port 13 of the separate drying vessel 10 and discharged therefrom through the at least one cooling gas discharge port 14 and a duct 34, into the predrying zone A through a duct 33 and the at least one predrying gas blowing port 4 and 4′ of the vertical type reactor 1, as the predrying gas at a temperature of for example 120° C.

The drying gas at a temperature of 130° C. containing steam of for example 310 g/Nm$^3$ after drying the green pellets, the carbonating binder of which has been carbonated, discharged from the drying zone C′ through the at least one drying gas discharge port 9′ of the separate drying vessel 10, is introduced through the duct 24 into a cyclone 25, where dust contained in the drying gas is removed, and then introduced through another duct 27 into a cooler 28 for preparing a carbonating gas. Part of the drying gas, dust contained in which has been removed by the cyclone 25, is introduced through the duct 26 into the high-temperature gas generating furance 18 as mentioned above, and is added to the high-temperature combustion exhaust gas in the high-temperature gas generating furnace 18 for the adjustment of the temperature of the high-temperature combustion exhaust gas.

The drying gas introduced into the cooler 28 from the drying zone C′, is mixed in the cooler 28 with carbon dioxide gas in a prescribed amount supplied through a carbon dioxide gas supply pipe 29 connected to the duct 27 to the cooler 28, and cooled in the cooler 28 to a prescribed temperature by means of cooling water ejected through a cooling water supply pipe 30 into the cooler 28, to prepare a carbonating gas at a temperature of for example 65° C. comprising carbon dioxide gas in a prescribed amount and saturated steam in a prescribed amount. The thus prepared carbonating gas is blown from the cooler 28 through a carbonating gas supply pipe 31 and the at least one carbonating gas blowing port 6 of the vertical type reactor 1 into the carbonating zone B. The cooling water having cooled the drying gas in the cooler 28 is discharged to outside from the cooler 28.

Figure 4:
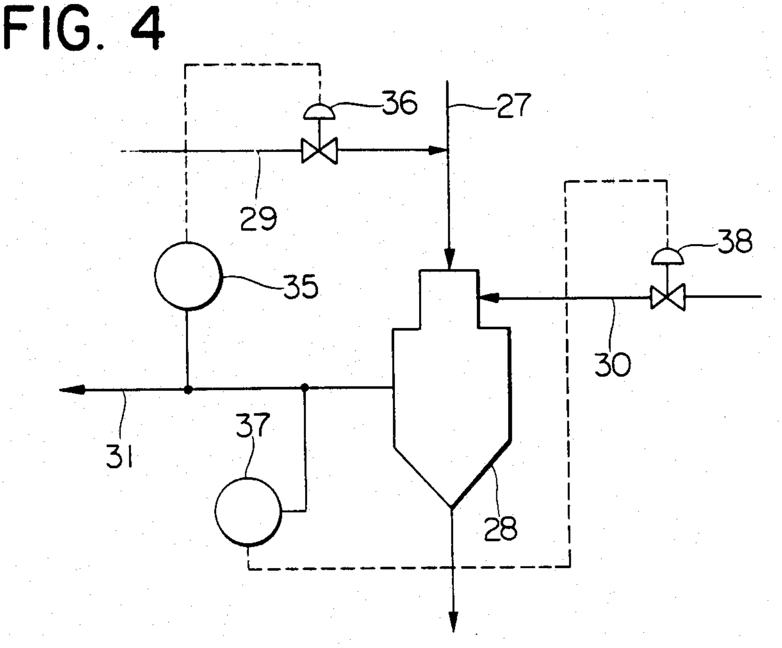
FIG. 4 is a schematic view illustrating an embodiment of the control mechanism for controlling the amount of carbon dioxide gas supplied into a cooler which is one of the components of the apparatus of the present invention in the third embodiment shown in FIG. 3, and the amount of cooling water ejected into the cooler.

In order to prepare the carbonating gas at the prescribed temperature comprising carbon dioxide gas in the prescribed amount and saturated steam in the prescribed amount in the cooler 28, it is necessary to properly control the amount of carbon dioxide gas supplied to the cooler 28 and the amount of cooling water ejected into the cooler 28. FIG. 4 is a schematic view illustrating an embodiment of the control mechanism for controlling such amounts of carbon dioxide and cooling water. As shown in FIG. 4, a carbon dioxide gas concentration meter 35 for measuring the carbon dioxide gas content in the carbonating gas and a thermometer 37 for measuring temperature of the carbonating gas are provided in the middle of the carbonating gas supply pipe 31. A carbon dioxide gas regulating valve 36 for regulating the flow rate of carbon dioxide gas is provided in the middle of the carbon dioxide gas supply pipe 29 for supplying carbon dioxide gas into the cooler 28. A cooling water regulating valve 38 for regulating the flow rate of cooling water is provided in the middle of the cooling water supply pipe 30 for ejecting cooling water into the cooler 28.

The carbon dioxide gas content in the carbonating gas prepared in the cooler 28 is continuously measured by the carbon dioxide gas concentration meter 35. The carbon dioxide gas content is controlled to a prescribed value by operating the carbon dioxide gas regulating valve 36 on the basis of the thus measured value of concentration. Furthermore, the temperature of the carbonating gas is continuously measured by the thermometer 37. The temperature of the carbonating gas is controlled to a prescribed value by operating the cooling water regulating valve 38 on the basis of the thus measured value of temperature.

According to the above-mentioned third embodiment of the apparatus of the present invention, it is possible to largely reduce the amount of heat required for predrying the green pellets, carbonating the carbonating binder contained in the green pellets and drying of the green pellets. More specifically, when setting the temperature of the predrying gas which is blown into the predrying zone A to 130° C., the temperature of the carbonating gas which is blown into the carbonating zone B to 65° C., and the temperature of the drying gas which is blown into the drying zone C′ to 210° C., a total amount of heat of 260 Mcal is required per ton of the manufactured non-fired pellets in order to heat these gases respectively to the above-mentioned temperatures. On the other hand the total amount of heat necessary for heating these gases to the respective temperatures can be reduced to only 140 Mcal per ton of the manufactured non-fired pellets by using, as the carbonating gas, the drying gas after drying the green pellets, the carbonating binder of which has been carbonated, in the drying zone C′, and using, as the predrying gas, the cooling gas having cooled the non-fired pellets in the cooling zone D and air heated through heat exchange with the high-temperature combustion exhaust gas in the heat exchanger 19, as in the above-mentioned third embodiment of the apparatus of the present invention.

In the apparatus of the above-mentioned third embodiment, the separate drying vessel 10 may have a construction in which the cooling zone D is not provided, and the green pellets, the carbonating binder of which has been carbonated, are only dried. When the separate drying vessel 10 has such a construction, the non-fired pellets dried and hardened in the separate drying vessel 10 are discharged from the non-fired pellet outlet 12 and allowed to cool spontaneously in open air while being transported on the conveyor 17. Only air heated through heat exchange with the high-temperature combustion exhaust gas in the heat exchanger 19 is blown through the duct 33 and the at least one predrying gas blowing port 4 and 4' of the vertical type reactor 1 into the predrying zone A.

Now, the present invention is described in more detail by means of Examples.

EXAMPLE 1

Slag produced when manufacturing medium-carbon ferromanganese in an amount of 10 wt. % as the carbonating binder and water in a prescribed amount were mixed with iron ore fines in an amount of 90 wt. % as the raw material. The resultant mixture was formed into green pellets having an average water content of 9.9 wt. % and an average particle size of 13 mm. The thus prepared green pellets were supplied into the apparatus shown in FIG. 2 to sequentially apply predrying, carbonation of the carbonating binder, drying and cooling under the following conditions:

(1) predrying gas: air at a temperature of 60° C.,
(2) predrying period: about 1 hour,
(3) temperature of green pellets after predrying: 40° C.,
(4) water content in green pellets after predrying: 4 wt. %,
(5) carbonating gas: a gas at a temperature of 65° C. comprising saturated steam of 19.7 vol. % and carbon dioxide gas of 80.3 vol. %,
(6) carbonating period of carbonating binder: about 9 hours,
(7) temperature of green pellets, the carbonating binder of which has been carbonated: 60° C.,
(8) drying gas: air at a temperature of 200° C.,
(9) drying period: about 1.5 hours,
(10) cooling gas: air at an ambient temperature, and
(11) cooling period: about 1 hour.

Figure 5:
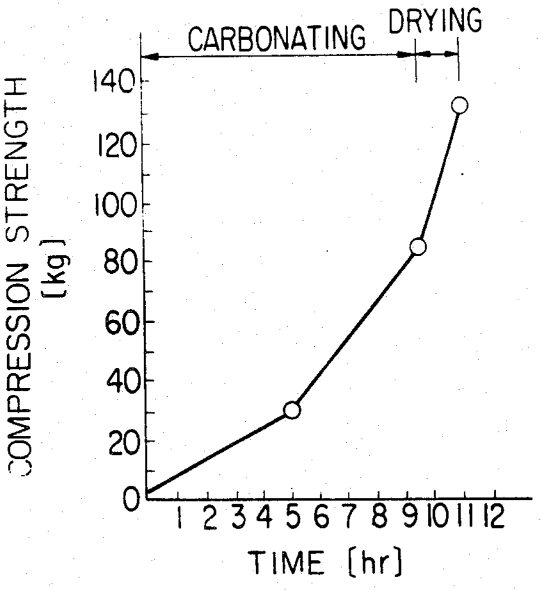
FIG. 5 is a graph illustrating compression strength of the non-fired pellets manufactured in accordance with Example 1 of the method of the present invention.

FIG. 5 is a graph illustrating compression strength of the non-fired pellets manufactured under the above-mentioned conditions. As shown in FIG. 5, the green pellets, the carbonating binder of which has been carbonated in the carbonating zone, showed an average compression strength of 85 kg per piece of green pellets, whereas the non-fired pellets after drying in the drying zone showed an average compression strength of 130 kg per piece of non-fired pellets. It was thus possible to manufacture the high-strength non-fired pellets excellent in quality at a high yield. Stable operations could be continuously carried out for a long period of time without occurrence of collapsing or sticking of the green pellets during travel through the vertical type reactor in operation.

EXAMPLE 2

Slaked lime in an amount of 10 wt. % as the carbonating binder and water in a prescribed amount were mixed with iron ore fines in an amount of 90 wt. % as the raw material. The resultant mixture was formed into green pellets having an average water content of 9.5 wt. % and an average particle size of 13 mm. The thus prepared green pellets were supplied into the apparatus shown in FIG. 2 to sequentially apply predrying and carbonation of the carbonating binder under the same conditions as in Example 1, then dried for about 2 hours by means of air at a temperature of 200° C. or a gas at a temperature of 200° C. containing carbon dioxide gas in an amount of 5 vol. % as the drying gas, and then cooled under the same conditions as in Example 1.

Figure 6:
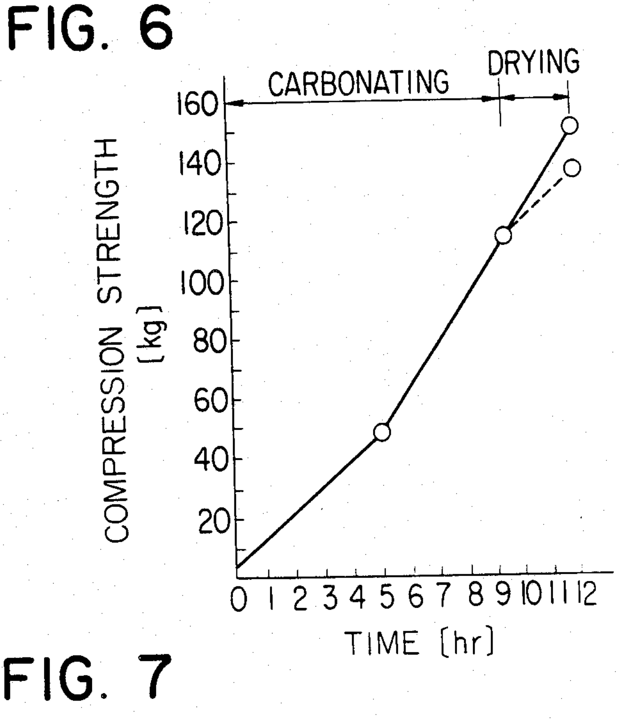
FIG. 6 is a graph illustrating compression strength of the non-fired pellets manufactured in accordance with Example 2 of the method of the present invention.

FIG. 6 is a graph illustrating compression strength of the non-fired pellets manufactured under the above-mentioned conditions. In FIG. 6, the solid line showing compression strength in the drying step represents the case with the gas at the temperature of 200° C. containing carbon dioxide gas in an amount of 5 vol. % used as the drying gas, and the dotted line showing compression strength in the drying step represents the case with air at a temperature of 200° C. used as the drying gas. As shown in FIG. 6, the green pellets, the carbonating binder of which has been carbonated in the carbonating zone, showed an average compression strength of 115 kg per piece of green pellets, whereas the non-fired pellets after drying when using air as the drying gas in the drying zone, showed an average compression strength of 140 kg per piece of non-fired pellets, and the non-fired pellets after drying when using the gas containing carbon dioxide gas as the drying gas showed an average compression strength of 150 kg per piece of non-fired pellets. When using the drying gas containing carbon dioxide gas, it was thus possible to manufacture non-fired pellets excellent in quality having a higher strength at a high yield. As in Example 1, collapsing or sticking of the green pellets was never caused during travel through the vertical type reactor in operation.

EXAMPLE 3

Coke breeze in an amount of 15 wt. % as the reducing agent, slag produced when manufacturing medium-carbon ferromanganese in an amount of 10 wt. % as the carbonating binder and water in a prescribed amount were mixed with manganese ore fines in an amount of 75 wt. % as the raw material. The resultant mixture was formed into green pellets having an average water content of 9.9 wt. % and an average particle size of 13 mm. The thus prepared green pellets were supplied into the apparatus shown in FIG. 2 to sequentially apply predrying, carbonation of the carbonating binder, drying and cooling under the following conditions:

(1) predrying gas: air at a temperature of 85° C.,
(2) predrying period: about 30 minutes,
(3) temperature of green pellets after predrying: 40° C.,
(4) water content in green pellets after predrying: 4.5 wt. %,
(5) carbonating gas: a gas at a temperature of 90° C. comprising saturated steam of 69 vol. % and carbon dioxide gas of 31 vol. %,
(6) carbonating period of carbonating binder: about 9.5 hours,
(7) temperature of green pellets, the carbonating binder of which has been carbonated: 90° C.,
(8) drying gas: air at a temperature of 200° C., (9) drying period: about 1.5 hours,

(10) cooling gas: air at an ambient temperature, and

(11) cooling period: about 1 hour.

Figure 7:
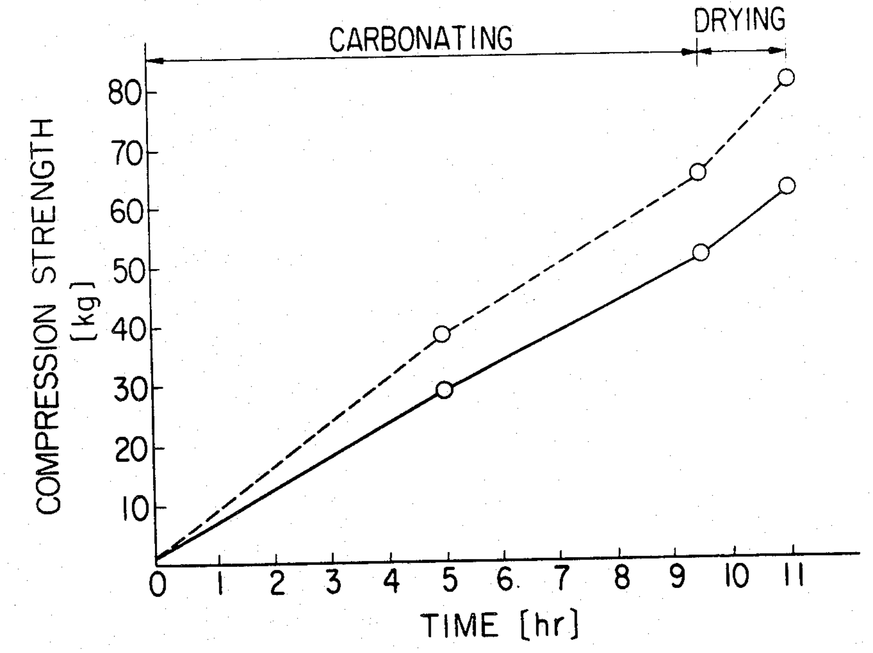
FIG. 7 is a graph illustrating compression strength of the non-fired pellets manufactured in accordance with Example 3 of the method of the present invention.

FIG. 7 is a graph illustrating compression strength of the non-fired pellets manufactured under the above-mentioned conditions. In FIG. 7, the solid line showing compression strength represents the case of carbonation of the carbonating binder effected under the atmospheric pressure, and the dotted line showing compression strength represents the case of carbonation of the carbonating binder under 2 atm. In this Example, the green pellets contained coke breeze as the reducing agent to improve reducibility of the non-fired pellets. It is generally believed that such green pellets containing coke breeze cannot give a sufficient compression strength even by applying carbonation of the carbonating binder. According to the method of the present invention, however, the non-fired pellets after drying in the drying zone had an average compression strength of 60 kg per piece of non-fired pellets even when the carbonating binder was carbonated under the atmospheric pressure, and in the case where the carbonating binder was carbonated under 2 atm, the non-fired pellets showed an average compression strength of 80 kg per piece of non-fired pellets. It was thus possible to manufacture the non-fired pellets excellent in quality having a sufficient strength to serve as a charge for an electric furnace at a high yield. As in Example 1, collapsing or sticking of the green pellets was never caused during travel through the vertical type reactor in operation.

EXAMPLE 4

To manufacture non-fired pellets as a raw material for manufacturing silicomanganese, coke breeze in an amount of 14 wt. % as the reducing agent, slag produced when manufacturing medium-carbon ferromanganese in an amount of 12 wt. % as the carbonating binder and water in a prescribed amount were mixed with raw materials comprising manganese ore fines in an amount of 64 wt. % and iron ore fines in an amount of 10 wt. %. The resultant mixture was formed into green pellets having an average water content of 9.7 wt. % and an average particle size of 13 mm. The blending ratios of the raw materials, the reducing agent and the carbonating binder mentioned above were the same as the blending ratios of raw materials for the manufacture of silicomanganese.

The thus prepared green pellets were supplied into the apparatus shown in FIG. 2 to sequentially apply predrying, carbonation of the carbonating binder, drying and cooling under the same conditions as in Example 1. The resultant non-fired pellets after drying in the drying zone showed an average compression strength of from 60 to 70 kg per piece of non-fired pellets. It was thus possible to manufacture the non-fired pellets excellent in quality having the sufficient strength to serve as a charge for an electric furnace at a high yield. As in Example 1, collapsing or sticking of the green pellets was never caused during travel through the vertical type reactor in operation. In this Example, the slag produced when manufacturing medium-carbon ferromanganese, which was added as the carbonating binder, is also a raw material as a manganese source for manufacturing silicomanganese. In this Example, therefore, the above-mentioned raw material as the manganese source would serve also as the carbonating binder, thus permitting very rational manufacture of the non-fired pellets.

According to the method and the apparatus for manufacturing non-fired pellets of the present invention, as described above in detail, it is possible, when continuously supplying green pellets into a vertical type reactor, and carbonating a carbonating binder contained in the green pellets, thereby hardening the green pellets to continuously manufacture non-fired pellets, to promote carbonation of the carbonating binder, permitting hardening of the green pellets, and furthermore to continuously manufacture high-strength non-fired pellets excellent in quality at a high yield in a short period of time without causing collapsing or sticking of the green pellets, thus providing many industrially useful effects.

What is claimed is:

1. A method for continuously manufacturing non-fired pellets, which comprises:

mixing a carbonating binder and water with raw materials which comprise at least one of (i) iron ore fines, (ii) nonferrous ore fines and (iii) dust mainly containing oxides of iron or non-ferrous metal, to form a mixture;

forming said mixture into green pellets having a water content of from over 7 to 20% by weight;

continuously supplying said green pellets into a vertical type reactor comprising a predrying zone, a carbonating zone following said pre-drying zone and a drying zone following said carbonating zone;

continuously passing said green pellets through said predrying zone, said carbonating zone and said drying zone sequentially in this order;

blowing a predrying gas having a relative humidity of up to 70% and a temperature within the range of from 40° to 250° C. into said predrying zone to predry the green pellets in said zone until the water content of the green pellets in said zone falls within the range of from 1 to 7% by weight;

blowing a carbonating gas into said carbonating zone to contact said green pellets and to carbonate said carbonating binder contained in the green pellets, said carbonating gas comprising carbon dioxide gas of from 5 to 95 vol. % and saturated steam of from 5 to 95 vol. % and having a temperature of from 30° to 98° C. whereby contact of said carbonating gas with the green pellets results in heat transfer from said carbonating gas to said green pellets, said heat transfer being compensated for by condensation heat which is generated by condensation of at least part of said saturated steam contained in said carbonating gas, thereby promoting carbonation of said carbonating binder contained in the green pellets; and blowing a drying gas at a temperature within the range of from 100° to 300° C. into said drying zone to dry the green pellets in said zone, thereby hardening the green pellets in said zone to continuously manufacture non-fired pellets.

2. The method as claimed in claim 1, wherein:

a gas containing carbon dioxide gas of at least 5 vol. % is used as said drying gas which is blown into said drying zone.

3. The method as claimed in claim 1, wherein:

at least one of slaked lime, a slag produced in steelmaking and a slag produced when manufacturing a ferroalloy is used as said carbonating binder.

4. The method as claimed in claim 2, wherein:

at least one of slaked lime, a slag produced in steelmaking and a slag produced when manufacturing a ferroalloy is used as said carbonating binder.

5. The method as claimed in claim 3 wherein:

a slag produced when manufacturing medium-carbon ferro-manganese is used as said carbonating binder.

6. The method as claimed in claim 4, wherein:

a slag produced when manufacturing medium-carbon ferro-manganese is used as said carbonating binder.

7

* * * * *